P. H. JOHNSON.
MEANS OF SUSPENSION OF VEHICLES.
APPLICATION FILED OCT. 15, 1921.
Reissued Feb. 21, 1922.
15,288.
3 SHEETS—SHEET 1.
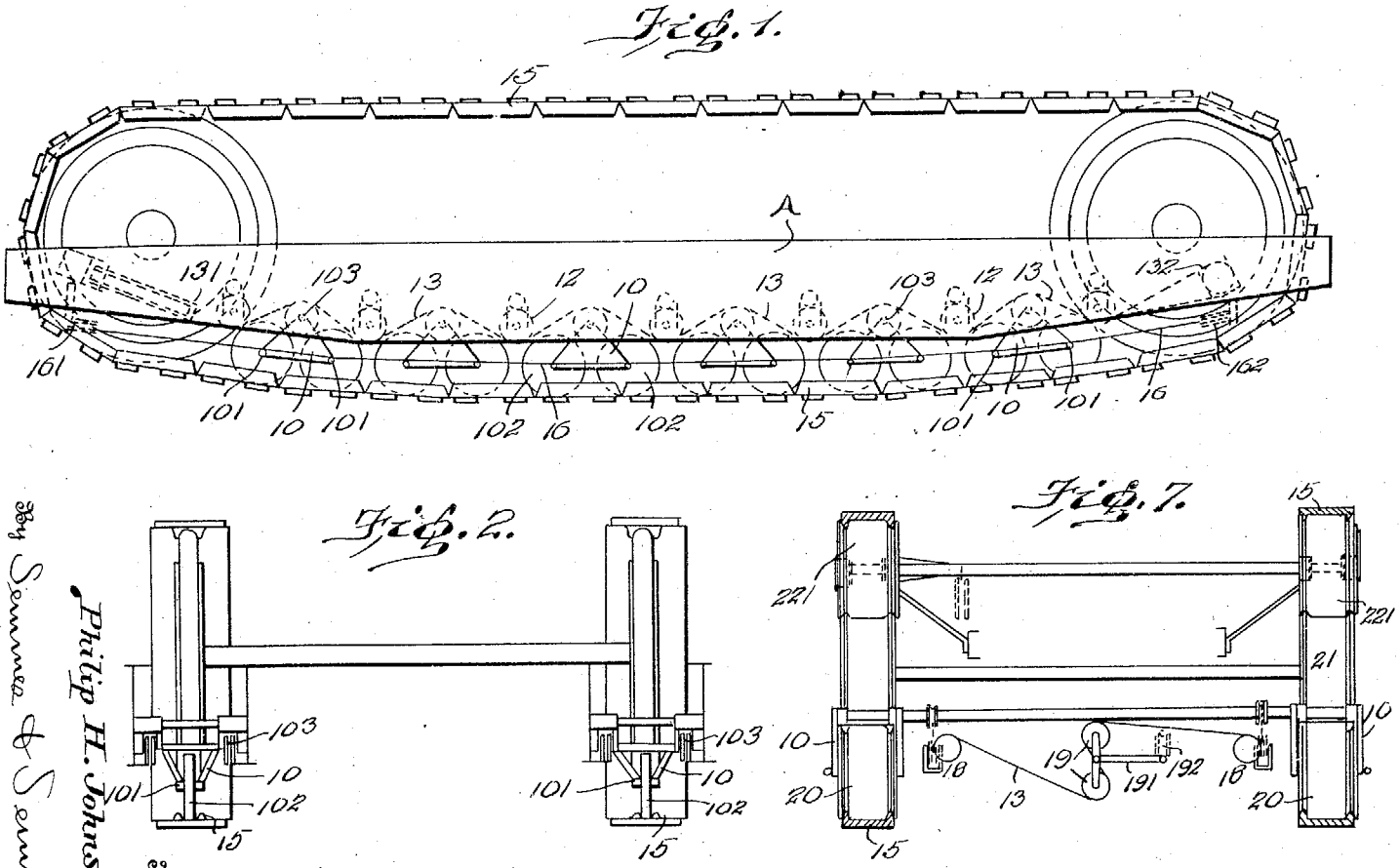
Inventor
Philip H. Johnson
By Semmes & Semmes
Attorneys

P. H. JOHNSON.

MEANS OF SUSPENSION OF VEHICLES.

APPLICATION FILED OCT. 15, 1921.

Reissued Feb. 21, 1922.

15,288.

3 SHEETS—SHEET 2.

Inventor
Philip H. Johnson
By Semmes & Semmes
Attorneys

P. H. JOHNSON.

MEANS OF SUSPENSION OF VEHICLES.

APPLICATION FILED OCT. 15, 1921.

Reissued Feb. 21, 1922.

15,288.

3 SHEETS—SHEET 3.

Inventor

Philip H. Johnson

By Semmes & Semmes

Attorneys

UNITED STATES PATENT OFFICE.

PHILIP H. JOHNSON, OF OLD CHARLTON, ENGLAND, ASSIGNOR TO ROADLESS TRACTION LIMITED, OF LONDON, ENGLAND.

MEANS OF SUSPENSION OF VEHICLES.

15,288. Specification of Reissued Letters Patent. Reissued Feb. 21, 1922.

Original No. 1,329,769, dated February 3, 1920, Serial No. 296,562, filed May 12, 1919. Application for reissue filed October 15, 1921. Serial No. 508,029.

*To all whom it may concern:*

Be it known that I, PHILIP HENRY JOHNSON, a subject of the King of Great Britain, residing at Old Charlton, Kent, England, have invented new and useful Improvements in Means of Suspension of Vehicles, of which the following is a specification.

This invention relates to improved means of suspension of vehicles and especially vehicles of the endless track type or those having an articulated track or independent track shoes, but it is also applicable to vehicles such as railway vehicles in which the axles are guided by horn plates.

The object of the invention is to provide an effective suspension for a variety of types of vehicles (whether designed to run on rails, roads or across open country) which will absorb shock caused by obstacles, undulations or irregularities of the surface traveled over, and distribute by compensation the load due to the weight of the vehicle over the various points of support.

In this specification, the word "rope" is used to describe any flexible connection similar to a rope and having the same general characteristics.

According to this invention a plurality of rope guides or pulleys is mounted in a plane at intervals along the vehicle and a plurality of other pulleys is arranged alternately to the first set, and a rope is passed under the pulleys of one set and over the pulleys of the other set alternately. The rope may be secured to the vehicle or may be endless passing around the vehicle and springs may be provided to increase the elasticity of the system and diminish shock to the rope.

One set of pulleys are body-supporting pulleys as they rest on the rope and thus sustain the body. The other set of pulleys support the rope and are themselves supported. This last mentioned set of pulleys is preferably arranged alternately with the body-supporting pulleys.

One set of pulleys may be carried on bogies having small wheels or rollers running on an endless track, which bogies on opposite sides of the vehicle may be rigidly connected together or adjacent bogies at each side of the vehicle may be flexibly connected together. More than one rope is usually employed, pulleys to carry them being arranged accordingly.

The drawings illustrate apparatus made in accordance with this invention.

Figure 1 is a side elevation and Fig. 2 is a transverse section.

Figs. 5 and 6 are a side elevation and a plan of a vehicle in which the bogies on opposite sides are connected together, while Fig. 7 is an end view.

Figure 4:
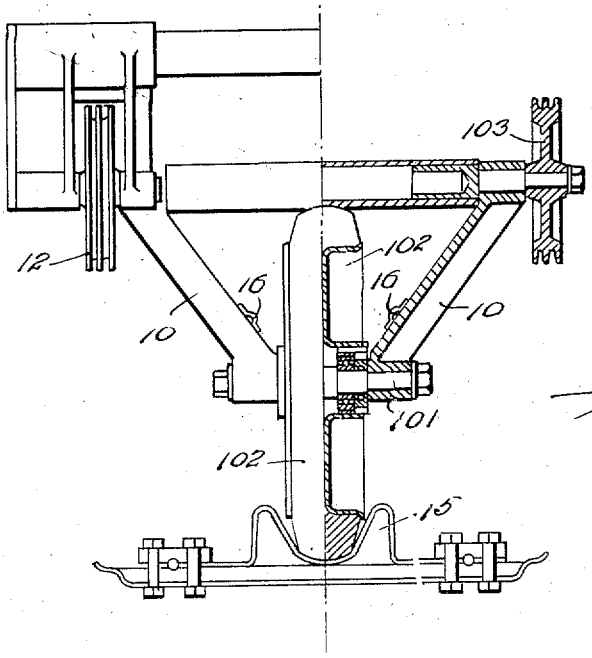
Fig. 3 is a side elevation and Fig. 4 is an end elevation partly in section of the same apparatus, both to a larger scale.

In Figs. 1 to 4, a number of bogies 10 have two axles 101 on which are wheels 102 running on an endless track 15 and on each bogie 10 are two double pulleys 103 and on the vehicle are two sets of pulleys 12, ropes 13 being secured to the vehicle at 131 and 132 passing over the pulleys 103 and under the pulleys 12. The bogies 10 are connected together by ropes 16 both ends of which are secured to the vehicle by means of springs 161 and 162 respectively. The bogies 10 float sidewise on the ropes between the pulleys 12 and the arrangement permits of steering without skidding that portion of the track in contact with the ground and bearing the weight of the vehicle.

Figure 3:
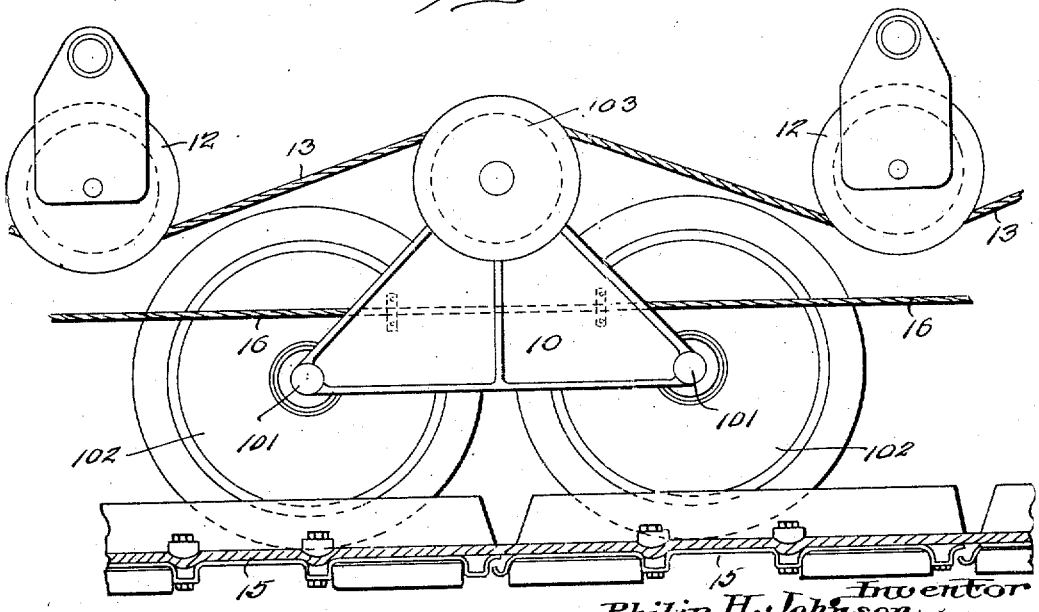
Figure 5:
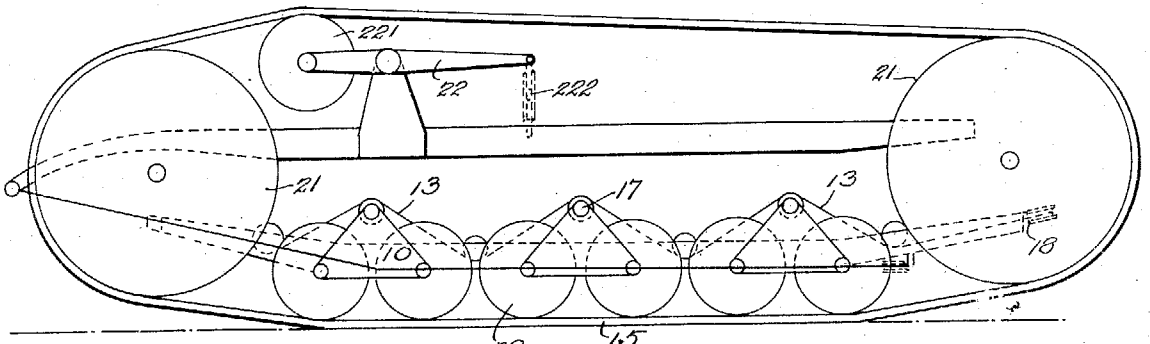
Figure 6:
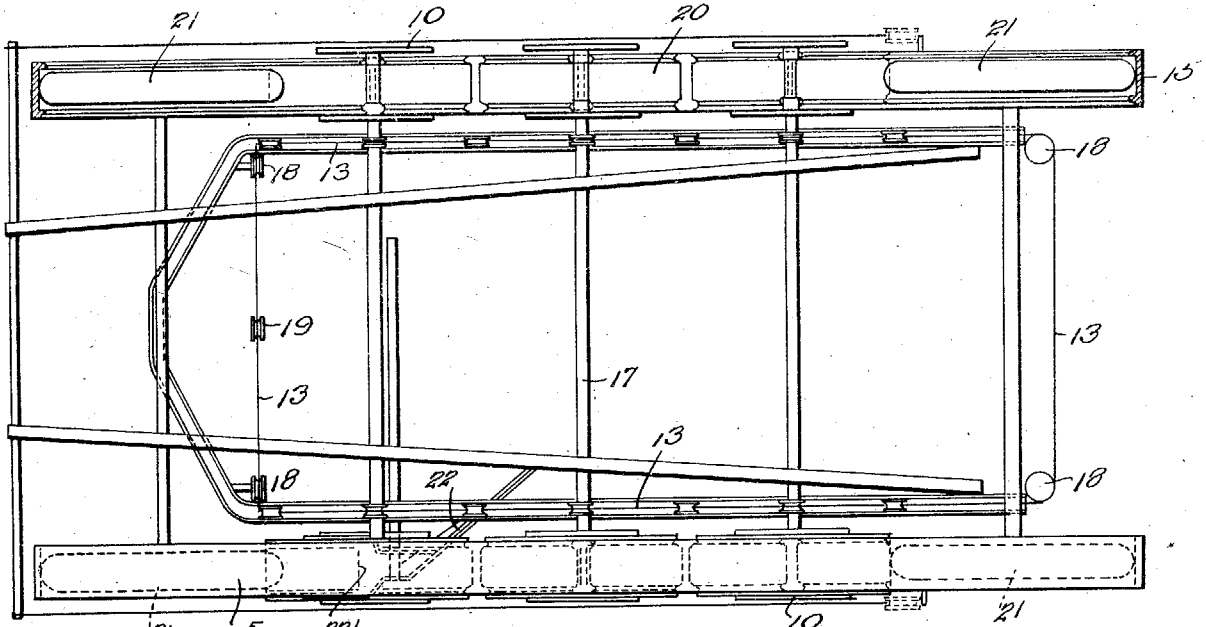

In Figs. 5, 6 and 7, the bogies 10 are arranged in a similar manner to those in Figs. 3 and 4 opposite bogies being connected together by shafts 17. One suspension rope 13 is required which is endless passing around pulleys 18 at the ends of the vehicle while at the rear end the rope passes around other pulleys 19 at the end of an arm 191 (see Fig. 7) whose movement is controlled by a spring 192. The endless tracks 15 are driven by wheels 21 and pass under the wheels 20 on the vehicle, and pivoted arms 22 having rollers 221 on one end bear against the tracks 15 to take up any slack under influence of springs 222 at the other end of the arms.

In operation, a shock transmitted to one bogie or support 10 tends to push the bogie or support 10 upward. This pulls on the rope 13 which in turn pulls on the other bogies or supports 10 equally, thus transmitting the shock from one bogie to the other bogies and distributing the shock equally among them. In ordinary operation, the play of the rope suspension between the independently movable supports will absorb all jar without transmitting the same to the vehicle body and with negligible functioning of any spring mechanism. The use of independently movable supports thus accomplishes a novel functioning of the device which renders it of great utility in vehicle suspension. The ropes 16 at all times keep the bogies spaced from one another and prevent possible interference of adjacent bogies.

It will be observed that the invention comprises a frame equipped with rope guides (12), independently movable supports (10) also equipped with rope guides, and a rope connected with said frame and passing across the guides to yieldingly sustain the frame on said supports.

When a rope-supporting pulley is raised or lowered with its support, when encountering an obstruction or irregularity in the ground surface, a reverse movement is given to an adjacent rope-supporting pulley and this change in the relation of the parts is transmitted, to a greater or less extent, through the series.

The mechanism shown in Figure 1 of the drawings may extend from one end of the vehicle to the other, or it may be arranged under one end thereof. The upper frame of the vehicle may be supported in any suitable way on the frame A, shown in Fig. 1. The frame A may be considered in its relation to the supports 10 a part of the vehicle body.

What I claim is:

1. A vehicle body having supports beneath it, equipped with pulleys mounted on said body and supports to turn about horizontal axes, and a rope connected with the vehicle body and passing over and under the pulleys to yieldingly sustain the vehicle body on said supports.

2. A vehicle body having supports beneath it, equipped with a set of pulleys mounted on the body to turn about horizontal axes and another set of pulleys mounted on the supports to turn about horizontal axes, and a rope connected to the vehicle body and passing over and under the pulleys to yieldingly sustain the vehicle body.

3. A vehicle combined with a plurality of pulleys arranged at intervals along the lower portion of the vehicle, a plurality of other pulleys on the vehicle supports arranged alternately to the first set and a rope passing under the pulleys of one plurality and over the pulleys of the other plurality alternately.

4. A vehicle combined with a plurality of pulleys arranged at intervals along the vehicle, a plurality of other pulleys arranged alternately to the first set and carried on bogies running on an endless track and a rope passing under the pulleys of one plurality and over the pulleys of the other plurality alternately.

5. A vehicle combined with a plurality of pulleys arranged at intervals along the vehicle, a plurality of other pulleys arranged alternately to the first set and carried on bogies running on an endless track, a flexible connection between adjacent bogies and a rope passing under the pulleys of one plurality and over the pulleys of the other plurality alternately.

6. A vehicle combined with a plurality of pulleys arranged at intervals along the vehicle, a plurality of other pulleys arranged alternately to the first set and carried on bogies running on an endless track, a flexible connection between adjacent bogies, a rigid connection between bogies on opposite sides of the vehicle, and a rope passing under the pulleys of one plurality and over the pulleys of the other plurality alternately.

7. A vehicle body having independently movable supports beneath it equipped with rope guides mounted on said body and said supports, and a rope connected with the vehicle body and passing across the rope guides to yieldingly sustain the vehicle body on said supports.

8. A vehicle body having independently movable supports beneath it equipped with a set of guides mounted on the body, another set of guides mounted on the supports, and a rope connected to the vehicle body and passing over and under the guides to yieldingly sustain the vehicle body.

9. A vehicle body equipped with rope guides, independently movable supports beneath the vehicle body also equipped with rope guides, and a rope connected with the vehicle body and passing across the rope guides to yieldingly sustain the vehicle body on said supports.

10. A vehicle body equipped with rope guides, supports beneath the vehicle body also equipped with rope guides, a rope connected with the vehicle body and passing across the rope guides to yieldingly sustain the vehicle body on said supports, and means for movably connecting the supports with each other.

11. A wheeled vehicle having a load carrying structure with independently movable supports beneath it equipped with rope guides mounted upon said structure and upon the supports, and a rope connected with the vehicle body and passing across the guides to yieldingly sustain the load carrying structure.

12. Suspension mechanism for vehicles comprising a frame equipped with rope guides, independently movable supports associated therewith also equipped with rope guides, and a rope connected with said frame and passing across said guides to yieldingly sustain the frame on said supports.

13. Suspension means for vehicles, comprising a plurality of rope-supporting guides, independently movable supports therefor, a plurality of body-supporting rope guides having a fixed relation to the body, and a body-supporting rope extending across the guides whereby when one of the rope-supporting guides is raised or lowered a reverse movement is imparted to an adjacent rope-supporting guide.

14. Suspension means for vehicles, comprising a plurality of rope-supporting guides, independently movable supports therefor, a plurality of body-supporting rope guides having a fixed relation to the body, and a body-supporting rope extending under the body-supporting guides and over the first-mentioned guides whereby when one of the rope-supporting guides is raised or lowered a reverse movement is imparted to an adjacent rope-supporting guide.

15. Suspension means for vehicles, comprising a plurality of rope guides, a wheel-carrying support for each of said guides, a plurality of body-supporting rope guides, and a body-supporting rope extending across said guides whereby when one of the rope-supporting guides is raised or lowered a reverse movement is imparted to the other rope-supporting guides.

16. A vehicle body having independently movable supports beneath it, rope-guiding pulleys on the supports, rope-guiding pulleys for supporting the vehicle and a rope passing over and under the pulleys to yieldingly sustain the vehicle whereby when one of the rope-supporting pulleys is raised or lowered a reverse movement is imparted to the other rope-supporting pulleys to a degree proportional to their propinquity to said last mentioned rope supporting pulley.

17. Suspension means for vehicles comprising a plurality of rope guides, wheeled supports therefor, a plurality of body-supporting rope guides and a body-supporting rope extending under the body-supporting guides and over the first-mentioned guides, in combination with a movable endless track on which the wheeled supports bear.

18. The combination with a vehicle body of independently movable supports beneath the body, rope guides on the vehicle body, rope guides on the supports, and a supporting rope for the body having means for holding it in place and which passes under and over said pulleys to yieldingly sustain the body on said supports.

19. Suspension means for vehicles comprising a frame, a plurality of frame-supporting pulleys thereon, a plurality of independently movable wheeled supports, pulleys thereon, and a body-supporting rope extending under the frame-supporting pulleys and over the other pulleys, for the purpose specified.

20. Suspension means for vehicles comprising a series of body-supporting rope guides having a fixed relation thereto, a series of intermediate rope guides, independently movable supports for said last-mentioned rope guides, and a body-supporting rope extending under the body-supporting rope guides and over the intermediate guides, whereby when one of the supports is raised or lowered a reverse movement is given to an adjacent support.

21. Suspension means for vehicles, comprising a frame, rope guides thereon, supporting members for said frame which are independently movable with relation thereto and extend to ground level, rope guides on said supporting members, and a body-supporting rope passing alternately under and over said rope guides.

22. Suspension means for vehicles comprising rope-guiding pulleys mounted to turn about horizontal axes and on which the weight of the vehicle is carried, other rope-guiding pulleys mounted to turn about horizontal axes, individually movable supports for said pulleys which transmit the weight to the ground, and a body-supporting rope extending across said pulleys to yieldingly sustain the vehicle on said supports.

23. A vehicle suspension comprising a rope, guides below the rope for supporting it at different points, independently movable supports for said guides which move vertically to raise and lower the rope and transmit the weight of the vehicle from the rope to the ground, and rope guides alternating with those first mentioned arranged above and resting on the rope and which transmit the weight of the vehicle thereto.

24. A vehicle suspension comprising a rope, on which the weight of the vehicle is supported, rope guides which support the rope at intervals, independently movable supports for said guides which transmit the weight of the vehicle to the ground, and guides which rest on the rope and transmit the weight of the vehicle thereto.

25. A vehicle suspension comprising a rope on which the weight of the vehicle is supported, a plurality of rope guiding pulleys which support the rope at intervals, independently movable supports for said pulleys which transmit the weight of the vehicle to the ground, and rope guiding pulleys mounted to move about horizontal axes which rest on the rope and transmit the weight of the vehicle thereto.

In testimony whereof I affix my signature.

PHILIP H. JOHNSON.